DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 30, 1969

869 O.G. 1385

T869,017

METHOD OF DEPOLYMERIZING POLY-(ETHYLENE TEREPHTHALATE)

Yves Etienne, Paris, and Robert Soulas, Vincennes, France. (Kodak Pathe, 30 Rue des Vignerons, Vincennes, Val-de-Marne, France)

Filed Dec. 17, 1968, Ser. No. 784,493

Int. Cl. C08g *53/22*

U.S. Cl. 260—2.3

No Drawing. 14 Pages Specification

Scrap poly(ethylene terephthalate) is depolymerized into a mixture predominantly comprising bis(2-hydroxyethyl terephthalate) and the corresponding dimer by reacting the scrap and ethylene glycol at a temperature of at least about 150° C. and in the presence of an inert, high-boiling solvent, wherein the amount of ethylene glycol is no more than about twice the amount theoretically required to convert all of said poly(ethylene terephthalate) to bis(2-hydroxyethyl terephthalate).